(12) United States Patent
Hsieh (10) Patent No.: US 10,408,991 B2
(45) Date of Patent: Sep. 10, 2019

(54) BACKLIGHT MODULE (71) Applicant: Coretronic Corporation, Hsin-Chu (TW)

(72) Inventor: Cheng-Hsi Hsieh, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 15/860,561

(22) Filed: Jan. 2, 2018

(65) Prior Publication Data
US 2018/0239080 A1 Aug. 23, 2018

(30) Foreign Application Priority Data
Feb. 20, 2017 (CN) .................. 2017 2 0149328 U (51) Int. Cl.
*F21V 8/00* (2006.01)
(52) U.S. Cl.
CPC ......... *G02B 6/0078* (2013.01); *G02B 6/0021* (2013.01); *G02B 6/0043* (2013.01); *G02B 6/0055* (2013.01); *G02B 6/0068* (2013.01); *G02B 6/0076* (2013.01); *G02B 6/0091* (2013.01)
(58) Field of Classification Search
CPC .. G02B 6/0078; G02B 6/0091; G02B 6/0043; G02B 6/0055; G02B 6/0068; G02B 6/0076
See application file for complete search history.

(56) References Cited

U.S. PATENT DOCUMENTS

| 2004/0135936 A1* | 7/2004 | Lee ...................... G02B 6/0043 349/64 |
| 2014/0098563 A1* | 4/2014 | Kim ...................... G02B 6/0076 362/606 |

FOREIGN PATENT DOCUMENTS

| CN | 203656813 U | 6/2014 |
| TW | 201323993 A1 | 6/2013 |

* cited by examiner

*Primary Examiner* — David V Bruce (57) ABSTRACT

A backlight module includes first and second light emitting layers. The first light emitting layer is disposed above the second light emitting layer and each includes at least one light guide plate and light source disposed next to the respective light guide plate. Each light guide plate has at least one light transmissive region and light exit region. Each light transmissive region of the first light emitting layer corresponds to each light exit region of the second light emitting layer. Each light exit region of the first light emitting layer corresponds to each light transmissive region of the second light emitting layer. Each light source is next to each light transmissive region. Each light transmissive region is between each light source and light exit region. Each light exit region of the first light emitting layer corresponds to each light transmissive region and light source of the second light emitting layer.

16 Claims, 4 Drawing Sheets

BACKLIGHT MODULE

CROSS-REFERENCE TO RELATED APPLICATION

This application claims the priority benefit of CN201720149328.9 filed on 2017 Feb. 20. The entirety of the above-mentioned patent application is hereby incorporated by reference herein and made a part of this specification.

FIELD OF THE INVENTION

The invention relates to a light source module, and more particularly to a backlight module.

BACKGROUND OF THE INVENTION

Liquid crystal display device needs to use a backlight module to illuminate the liquid crystal display panel to control the brightness level of the image. Due to the restrictions of current liquid crystal display panel in technical and the principle, there are still some light from the backlight module will pass through the liquid crystal display panel to form the so-called "dark-state light leakage" when the liquid crystal display panel is in dark state, and therefore the contrast of the liquid crystal display device is reduced.

In order to improve the contrast of the liquid crystal display device, the prior art has developed a backlight module having a local dimming function. According to the illumination direction of the light source, the backlight modules can be divided into three types: direct-illumination type, edge-illumination type and mixing-illumination type.

The direct-illumination type backlight module disposes a plurality group of light sources below the liquid crystal display panel and has the advantage of multi local dimming. However, a certain light mixing chamber is required and therefore the thickness of the direct-illumination type backlight module is relatively large.

The edge-illumination type backlight module disposes the light sources around the liquid crystal display panel and has the advantage of smaller thickness. However, the edge-illumination type backlight module has less local dimming due to the restriction in the design of the light guide plate.

The mixing-illumination type backlight module divides the light guide plate into a plurality of blocks or areas with a plurality group of corresponding light sources and therefore has the advantages of multi local dimming of the direct-illumination type backlight module and the smaller thickness of the edge-illumination type backlight module. However, since the area between the light source and the light guide plate is located in the display area of the liquid crystal display panel, uneven brightness may occur.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a backlight module to improve the problem of uneven brightness in the mixing-illumination type backlight module in prior art.

Other objectives and advantages of the invention will become apparent from the technical features disclosed in the invention.

In order to achieve one or some or all of the above objects or other objects, an embodiment of the invention provides a backlight module, which includes a first light emitting layer and a second light emitting layer. The first light emitting layer is disposed above the second light emitting layer. The first light emitting layer and the second light emitting layer each include at least one light guide plate and at least one light source. Each light guide plate is disposed with at least one light source on a side thereof. Each light guide plate has at least one light transmissive region and at least one light exit region. Each light transmissive region of the first light emitting layer corresponds to each light exit region of the second light emitting layer. Each light exit region of the first light emitting layer corresponds to each light transmissive region of the second light emitting layer. Each light source is disposed next to each light transmissive region. Each light transmissive region is located between each light source and each light exit region. Each light exit region of the first light emitting layer corresponds to each light transmissive region and each light source of the second light emitting layer.

By adopting the design of the first light emitting layer and the second light emitting layer design, the advantage of mixing-illumination type backlight module is achieved; that is, the thickness of the backlight module of the invention is smaller than that of the direct-illumination type backlight module in prior art and the local dimming of the backlight module of the invention is larger than that of the edge-illumination type backlight module in prior art. In addition, by corresponding the light transmissive region of the first light emitting layer to the respective light exit region of the second light emitting layer and corresponding the light exit region of the first light emitting layer to the respective light transmissive region of the second light emitting layer, the problem of uneven brightness in the mixing-illumination type backlight module in prior is improved.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

The backlight module of the invention can be applied to, for example, a liquid crystal display device so that the liquid crystal display device has a function of local dimming, wherein a liquid crystal display panel (not shown) is disposed on the backlight module. The backlight module includes a first light emitting layer and a second light emitting layer. The first light emitting layer is disposed above the second light emitting layer. The first light emitting layer and the second light emitting layer each include at least one light guide plate and at least one light source. Each light guide plate is disposed with at least one light source on a side thereof. Each light guide plate has at least one light transmissive region and at least one light exit region. Each light transmissive region of the first light emitting layer corresponds to each light exit region of the second light emitting layer. Each light exit region of the first light emitting layer corresponds to each light transmissive region of the second light emitting layer. Each light source is disposed next to each light transmissive region. Each light transmissive region is located between each light source and each light exit region. Each light exit region of the first light emitting layer corresponds to each light transmissive region and each light source of the second light emitting layer. A plurality of embodiments of the inventive of backlight module will be described below with reference to the drawings.

Figure 1:
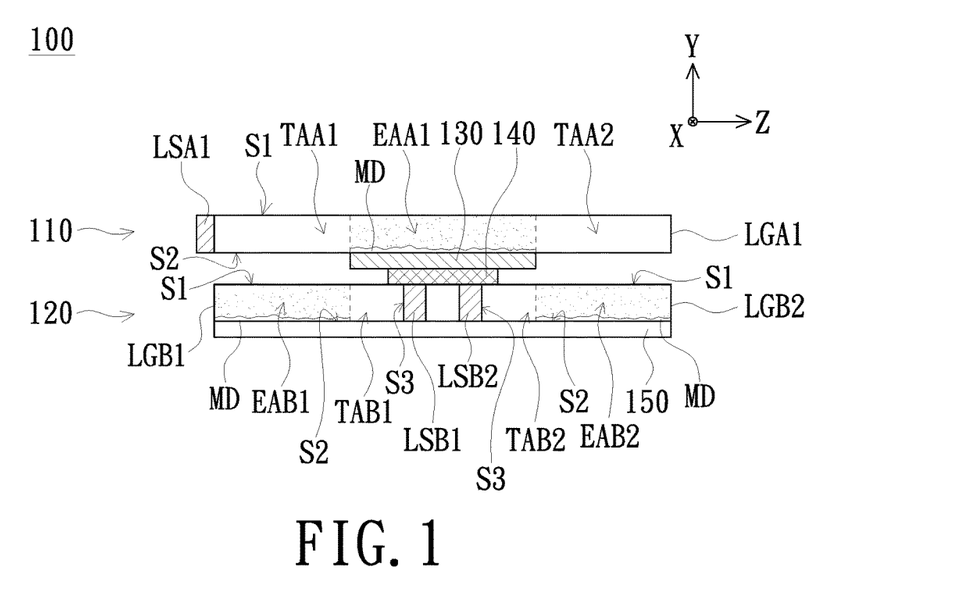
FIG. 1 is a schematic view of a backlight module in accordance with an embodiment of the invention.

FIG. 1 is a schematic view of a backlight module in accordance with an embodiment of the invention. Referring to FIG. 1, the backlight module 100 of the embodiment includes a first light emitting layer 110 and a second light emitting layer 120. The first light emitting layer 110 is disposed above the second light emitting layer 120. The first light emitting layer 110 includes a light guide plate LGA1 and a light source LSA1 disposed next to the light guide plate LGA1. The second light emitting layer 120 includes two light guide plates LGB1, LGB2 and two light sources LSB1, LSB2 disposed next to the light guide plates LGB1, LGB2 respectively. The light guide plate LGA1 includes two light transmissive regions TAA1, TAA2 and a light exit region EAA1 located between the two light transmissive regions TAA1, TAA2. The light guide plate LGB1 has an adjacent light transmissive region TAB1 and a light exit region EAB1, and the light guide plate LGB2 has an adjacent light transmissive region TAB2 and a light exit region EAB2. The light transmissive regions TAA1, TAA2 of the first light emitting layer 110 correspond to the light exit regions EAB1, EAB2 of the second light emitting layer 120, respectively; and the light exit region EAA1 of the first light emitting layer 110 corresponds to the light transmissive regions TAB1, TAB2 of the second light emitting layer 120. The light source LSA1 is disposed next to the light transmissive region TAA1, the light source LSB1 is disposed next to the light transmissive region TAB1, the light source LSB2 is disposed next to the light transmissive region TAB2, the light transmissive region TAA1 is located between the light source LSA1 and the light exit region EAA1, the light transmissive region EAB1 is located between the light source LSB1 and the light exit region EAB1, and the light transmissive region TAB2 is located between the light source LSB2 and the light exit region EAB2.

The correspondence relationship between the light transmissive region of the first light emitting layer 110 and the light exit region of the second light emitting layer 120 and the correspondence relationship between the light exit region of the first light emitting layer 110 and the light transmissive region of the second light emitting layer 120 are not limited to one-on-one relationship, and may be a one-to-many or many-to-one relationship. Taking FIG. 1 as an example. The two light transmissive regions TAB1, TAB2 of the second light emitting layer 120 correspond to the same light exit region EAA1 of the first light emitting layer 110, for example. In addition, the light transmissive region described above is referred to as a region in which most of the light, provided by the light source next to the light guide plate and after entering the light guide plate, can be totally reflected without emitting out from the light guide plate. The light exit region of the light guide plate described above is referred to as a region in which most of the light, after being transmitted from the light transmissive region, can exit from the light guide plate. Specifically, the light exit regions EAA1, EAB1, EAB2 of the light guide plates LGA1, LGB1, LGB2 are disposed with, for example, a dotted microstructure MD to destroy the total reflection inside the light guide plates LGA1, LGB1, LGB2, so that the light can emit out from the light guide plates LGA1, LGB1, LGB2 through the light exit regions EAA1, EAB1, EAB2. Each of the light guide plates LGA1, LGB1, LGB2 has an opposing top surface 51 and a bottom surface S2. The dotted microstructure MD may be disposed on the top surface 51 or the bottom surface S2, and FIG. 1 is exemplified by disposing the dotted microstructure MD on the bottom surface S2. The dotted microstructure MD may be a printed dot, a microstructural bump, a microstructural pits, or microstructures with dotted distribution capable of destroying the total reflection of light, but the invention is not limited thereto. In addition, the dot distribution density of the dotted microstructure MD is gradually increased, for example, from the side near the corresponding light source toward the side away from the corresponding light source so that the light is evenly distributed.

The light sources LSA1, LSB1, LSB2 may be a line light source extending in the X-axis direction in FIG. 1, such as a cold cathode fluorescent lamp or a point light source light bar including a plurality of point light sources (such as a light emitting diode light bar), but the invention does not limit the type of light source. In addition, the light exit region EAA1 of the first light emitting layer 110 corresponds, for example, the light transmissive regions TAB1, TAB2 and the light sources LSB1, LSB2 of the second light emitting layer 120. That is, the light transmissive regions TAB1, TAB2 and the light sources LSB1, LSB2 of the second light emitting layer 120 are located below the light exit region EAA1 of the first light emitting layer 110 and are covered by the light emitting area EAA1 of the first light emitting layer 110.

By controlling the on or off of the light source LSA1, LSB1, LSB2, the on-time periods of the light source LSA1, LSB1, LSB2 are controlled; or by controlling the driving currents LS of the light source LSA1, LSB1, LSB2, the light source LSA1, LSB1, LSB2 are controlled to whether or not have light exiting from the light exit regions of the corresponding light guide plate or to have a certain strength of the exited light; however, the invention is not limited to the above control way. In the embodiment, the light exit regions EAB1, EAB2 of the second light emitting layer 120 correspond to the light transmissive regions TAA, TAA2 of the first light emitting layer 110, respectively. The light exiting from the light exit region EAB1 of the second light emitting layer 120 passes through the light transmissive region TAA1 of the corresponding first light emitting layer 10 and is transmitted to the liquid crystal display panel of the liquid crystal display device. The light exiting from the light exit region EAB2 of the second light emitting layer 120 passes through the light transmissive region TAA2 of the corresponding first light emitting layer 110 and is transmitted to the liquid crystal display panel of the liquid crystal display device. The light exiting from the light exit region EAA1 of the first light emitting layer 110 is also transmitted to the liquid crystal display panel. Since the corresponding light exit regions EAA1, EAB1, EAB2 have light emitted therefrom when the light sources LSA1, LSB1, LSB2 emit light, therefore, by controlling the on-time periods of the light sources LSA1, LSB1, LSB2 via controlling the on or off of the light sources LSA1, LSB1, LSB2 or by controlling the driving current of the light sources LSA1, LSB1, LSB2, the effect of local dimming is achieved so that the liquid crystal display device has the function of local dimming. In addition, in one embodiment, the light emit region EAA1 of the first light emitting layer 110 and the light exit regions EAB1, EAB2 of the second light emitting layer 120 may be partially overlapped to reduce the occurrence of the dark fringe between the light exit region EAA1 of the first light emitting layer 110 and the light exit regions EAB1, EAB2 of the second light emitting layer 120, thereby improve the brightness uniformity of the backlight module 100. Although the second light emitting layer 120 is exemplified by including two light sources LSB1, LSB2 in FIG. 1, one light source only may be adopted to provide light to the two light guide plates LGB1, LGB2 of the second light emitting layer 120 to simultaneously control whether or not there is light exiting from the light exit regions EAB1, EAB2 of the two light guide plates LGB1, LGB2 of the second light emitting layer 120 or to control the strength of the exited light.

The backlight module 100 may further include a reflective layer 130. The reflective layer 130 is disposed between the first light emitting layer 110 and the second light emitting layer 120, located below the light exit region EAA1 of the first light emitting layer 110 and covering the light sources LSB1, LSB2 and the light exit regions TAB1, TAB2 of the second light emitting layer 120. When only the light source LSA1 of the first light emitting layer 110 is turned on, the reflective layer 130 may be used to reflect the light leaked from the bottom surface S2 of the light guide plate LGA1 of the first light emitting layer 110 back to the light guide plate LGA1 of the first light emitting layer 110 to increase light use efficiency. When only the light sources LSB1, LSB2 of the second light emitting layer 120 are turned on, the reflective layer 130 may be used to cover the light sources LSB1, LSB2 of the second light emitting layer 120 to avoid the light emitted from the light sources LSB1, LSB2 of the second light emitting layer 120 to exit from the light exit region EAA1 of the first light emitting layer 110, thereby facilitate the light emitted from the light sources LSB1, LSB2 to exit from the light exit regions EAB1, EAB2 of the second light emitting layer 120 and achieve the effect of local dimming. When the light source LSA1 of the first light emitting layer 110 and the light sources LSB1, LSB2 of the second light emitting layer 120 are turned on at the same time, the reflective layer 130 can also achieve the above-mentioned effect, thereby improve the brightness uniformity of the backlight module 100. The reflective layer 130 is, for example, a metal reflective sheet, a white reflective sheet or other suitable reflective sheet, but the invention is not limited thereto. In addition, the backlight module 100 may further include a light absorbing layer 140 disposed between the reflective layer 130 and the second light emitting layer 120 and covering the light sources LSB1, LSB2 of the second light emitting layer 120. The light absorbing layer 140 may also be used to avoid the light leakage occurring where the light sources LSB1, LSB2 of the second light emitting layer 120 are disposed. The light absorbing layer 140 is, for example, a black paint or other suitable light absorbing element, but the invention is not limited thereto. In another embodiment, the light leakage occurring where the light sources LSB1, LSB2 of the second light emitting layer 120 may be avoided by disposing either the reflective layer 130 or the light absorbing layer 140 only between the first light emitting layer 110 and the second light emitting layer 120 and covering the light sources LSB1, LSB2 of the second light emitting layer 120.

The backlight module 100 may further include a reflective layer 150 disposed below the light guide plates LGB1, LGB2 of the second light emitting layer 120. The reflective layer 150 may be used to reflect the light leaked from the bottom surface S2 of the light guide plates LGB1, LGB2 of the second light emitting layer 120 back to the light guide plates LGB1, LGB2 of the second light emitting layer 120. The reflective layer 150 is, for example, a metal reflective sheet, a white reflective sheet or other suitable reflective sheet, but the invention is not limited thereto. In addition, the backlight module 100 may further include at least one optical film (not shown) disposed above the first light emitting layer 110. The optical film may be a diffusion film, a brightness enhancement film or the like, but the invention is not limited thereto.

Figure 2:
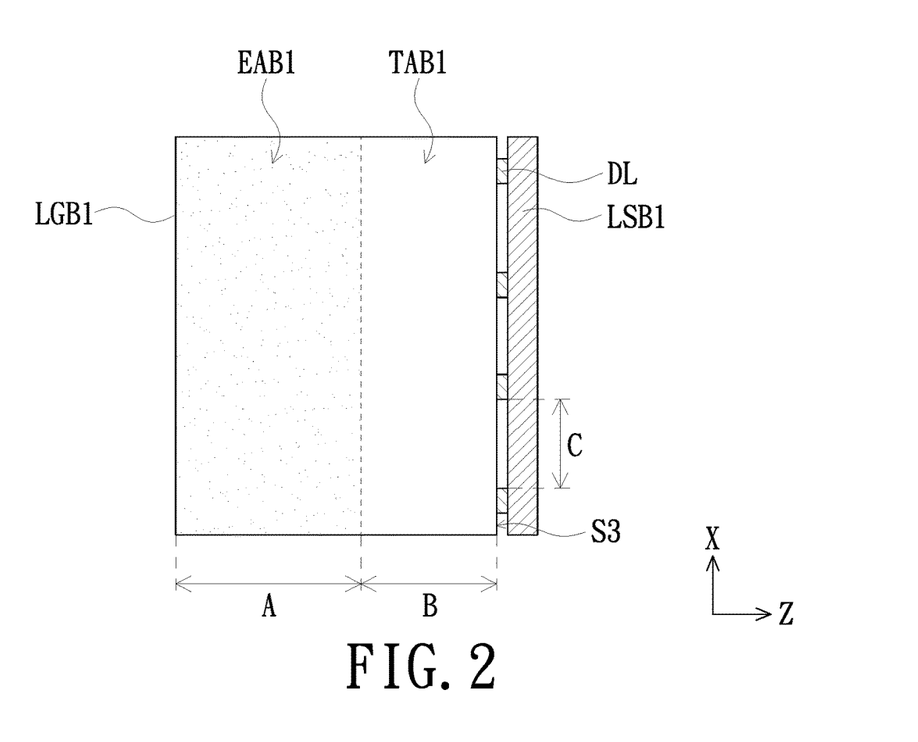
FIG. 2 is a schematic top view of the light guide plate and the light source on the left side of the second light emitting layer of the backlight module of FIG. 1.

FIG. 2 is a schematic top view of the light guide plate and the light source on the left side of the second light emitting layer of the backlight module of FIG. 1. Referring to FIG. 2, in general, when a point light source light bar is used as the light source LSB1, the light provided by the point light source DL (such as a light emitting diode) needs a sufficient light mixing space to avoid uneven brightness. If the light mixing space is insufficient, it is often necessary to shorten the distance between the point light sources DL to avoid the problem of uneven brightness; however, the total number of point light sources DL may increase accordingly and thereby increase the cost. In the embodiment, since the light transmissive region TAB1 adjacent to the light source LSB1 can be used as the light mixing space and the distance between the point light sources DL can be appropriately increased, so that the total number of the point light sources DL can be reduced and thereby reduce the cost. Similarly, when a point light source light bar is used as the light source LSB2, LSA1, the total number of point light source can also be reduced and thereby reduce the cost.

Since the distance between the point light sources DL of the embodiment can be appropriately increased, the backlight module 100 may conform to the relationship: C<B≤A, wherein the widths of the light exit regions EAB1, EAB2 of the light guide plates LGB1, LGB2 are A, the widths of the light transmissive regions TAB1, TAB2 of the light guide plates LGB1, LGB2 are B, and the distance between the adjacent two point light sources DL is C in the normal direction (Z-axis direction) of the light entrance surface S3 (the surface to which the light sources LSB1, LSB2 face) of the light guide plates LGB1, LGB2 of the second light emitting layer 120. In one embodiment, the backlight module 100 may conform to the relationship: 2C<B≤0.95 A. Similarly, the light source LSA1 and the light guide plate LGA1 of the first light emitting layer 110 can be designed in this manner so as to reduce the total number of the point light sources DL and thereby reduce the cost.

Figure 3:
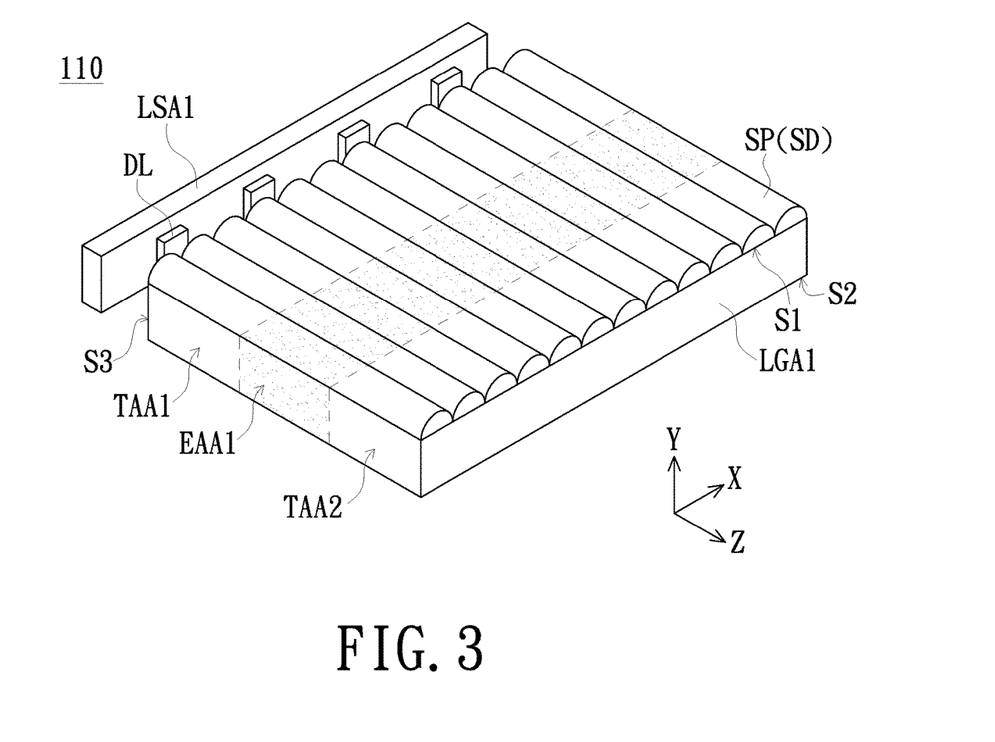
FIG. 3 is a schematic perspective view of a first light emitting layer of a backlight module in accordance with an embodiment of the invention.

FIG. 3 is a schematic perspective view of a first light emitting layer of a backlight module in accordance with an embodiment of the invention. Referring to FIG. 3, when a point light source light bar is used as the light source LSA1, the dotted microstructure (not shown) may be disposed on the bottom surface S2 of the light guide plate LGA1, and the top surface 51 of the light guide plate LGA1 may be disposed with a stripe microstructure SD. The stripe microstructure SD includes a plurality of stripe patterns SP, and of the stripe patterns SP extends to cover the light transmissive regions TAA1, TAA2 and the light exit region EAA1 of the light guide plate LGA1. Each of the stripe patterns SP extends, for example, in the normal direction (Z-axis direction) of the light entrance surface S3. The strip pattern SP in FIG. 3 is, for example, a semicircular column; and in other embodiments, the strip pattern SP may be a cylinder or a groove with other shapes; and the invention is not limited thereto. The stripe pattern SP can control the transmission range of the light in the X-axis direction, so that the light exit region EAA1 can be further divided into a plurality of sub-light exit regions. Each of the sub-light exit regions may correspond to a point light source DL or a group of point light sources DL. Therefore, by controlling the on-time period of each point light source DL (or each group of point light sources DL) via controlling the on or off of each point light source DL (or each group of point light sources DL) or by controlling the driving current of each point light source DL (or each group of point light sources DL), the sub-light exit region is controlled to whether or not having light exiting therefrom or to have a certain brightness of the exited light. Although FIG. 3 illustrates how the light exit region EAA1 is divided into a plurality of sub-light exit regions by taking the first light emitting layer 110 as an example, such a design is also applicable to the light guide plates LGB1, LGB2 of the second light emitting layer 120 in FIG. 1. In this way, the backlight module 100 of the embodiment of the invention can have a variety of local dimming effects.

Although the first light emitting layer 110 in FIG. 1 is exemplified by including a light guide plate LGA1 and a light source LSA1 and the second light emitting layer 120 is exemplified by including two light guide plates LGB1, LGB2 and two light sources LSB1, LSB2, the total numbers of the light guide plate and the light source of the first light emitting layer 110 and the second light emitting layer 120 as well as the total numbers of the light transmissive region and the light exit region of the light guide plate are not limited in the invention. One of the design concepts of the invention is that the light transmissive region of the first light emitting layer 110 corresponds to the light exit region of the second light emitting layer 120 and the light exit region of the first light emitting layer 110 corresponds to the light transmissive region of the second light emitting layer 120. According to this design concept, a variety of architectures can be developed. A plurality of embodiments with different architectures will be described as follow, but the invention is not limited to the embodiments described herein.

Figure 4:
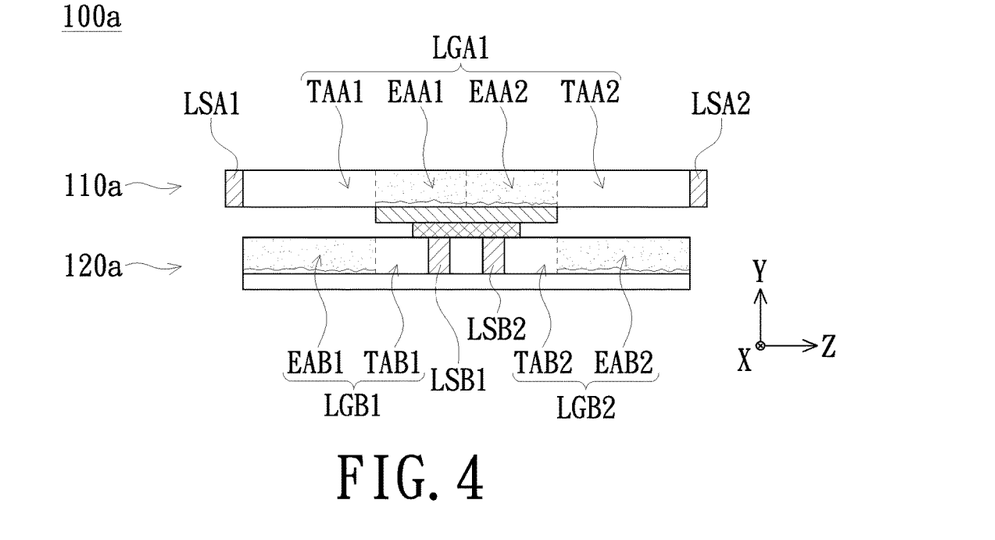
FIG. 4 is a schematic view of a backlight module in accordance with another embodiment of the invention.

FIG. 4 is a schematic view of a backlight module in accordance with another embodiment of the invention. Referring to FIG. 4, the backlight module 100a of the embodiment includes a first light emitting layer 110a and a second light emitting layer 120a. The first light emitting layer 110a includes two light sources LSA1, LSA2 and a light guide plate LGA1. The light guide plate LGA1 of the first light emitting layer 110a includes two light transmissive regions TAA1, TAA2 and adjacent two light exit regions EAA1, EAA2 located between the two light transmissive regions TAA1, TAA2. The two light sources LSA1, LSA2 of the first light emitting layer 110a are disposed next to the two light transmissive regions TAA1, TAA2 of the first light emitting layer 110a, respectively. The second light emitting layer 120a includes two light sources LSB1, LSB2 and two light guide plates LGB1, LGB2.

The light guide plate LGB1 of the second light emitting layer 120a includes a light transmissive region TAB1 and a light exit region EAB1. The light guide plate LGB2 of the second light emitting layer 120a includes a light transmissive region TAB2 and a light exit region EAB2. The two light transmissive regions TAB1, TAB2 of the second light emitting layer 120a correspond to the two light exit regions EAA1, EAA2 of the first light emitting layer 110a, respectively. The two light exit regions EAB1, EAB2 of the second light emitting layer 120a correspond to the two light transmissive regions TAA1, TAA2 of the first light emitting layer 110a. The two light sources LSB1, LSB2 of the second light emitting layer 120a are disposed next to the two light transmissive regions TAB1, TAB2 of the second light emitting layer 120a and correspond to the two light exit regions EAA1, EAA2 of the first light emitting layer 110a, respectively.

The light guide plate LGA1 of the first light emitting layer 110a may be replaced by two light guide plates both including a light transmissive region and a light exit region. In addition, although the second light emitting layer 120a is exemplified by including two light sources LSB1, LSB2, one light source only may be adopted to provide light to the two light guide plates LGB1, LGB2 of the second light emitting layer 120a to simultaneously control whether or not there is light exiting from the light exit regions EAB1, EAB2 of the two light guide plates LGB1, LGB2 of the second light emitting layer 120a or to control the strength of the exited light.

Figure 5:
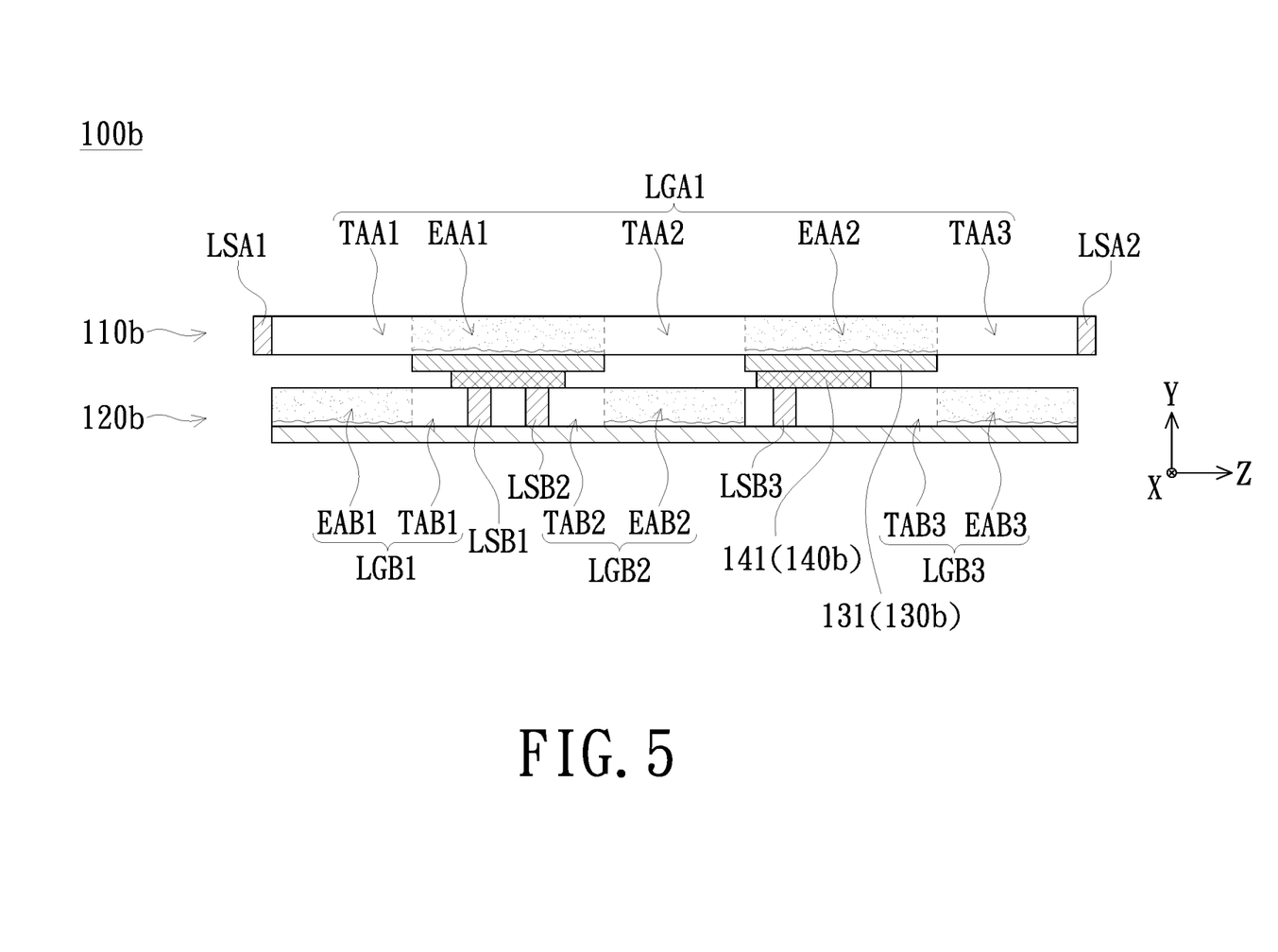
FIG. 5 is a schematic view of a backlight module in accordance with another embodiment of the invention.

FIG. 5 is a schematic view of a backlight module in accordance with another embodiment of the invention. Referring to FIG. 5, the backlight module 100b of the embodiment includes a first light emitting layer 110b and a second light emitting layer 120b. The first light emitting layer 110b includes two light sources LSA1, LSA2 and a light guide plate LGA1. The light guide plate LGA1 of the first light emitting layer 110b includes three light transmissive regions TAA1, TAA2, TAA3 and two light exit regions EAA1, EAA2 which are alternately disposed. The two light sources LSA1, LSA2 of the first light emitting layer 110b are disposed next to the light transmissive regions TAA1, TAA3 located on the two sides of the first light emitting layer 110b.

The second light emitting layer 110b includes three light sources LSB1, LSB2, LSB3 and three light guide plates LGB1, LGB2, LGB3. The light guide plate LGB1 includes a light transmissive region TAB1 and a light exit region EAB1. The light guide plate LGB2 includes a light transmissive region TAB2 and a light exit region EAB2. The light guide plate LGB3 includes a light transmissive region TAB3 and a light exit region EAB3. The two light exit regions TAB1, TAB2 of the second light emitting layer 120b correspond to the light exit region EAA1 of the first light emitting layer 110b. The light transmissive region TAB3 of the second light emitting layer 120b corresponds to the light exit region EAA2 of the first light emitting layer 110b. The three light exit regions EAB1, EAB2, EAB3 of the second light emitting layer 120b correspond to the three light transmissive regions TAA1, TAA2, TAA3 of the first light emitting layer 110b, respectively. The three light sources LSB1, LSB2, LSB3 of the second light emitting layer 120b are disposed next to the light transmissive regions TAB1, TAB2, TAB3 of the second light emitting layer 120b, respectively. In addition, the light sources LSB1, LSB2 correspond to the light exit region EAA1 of the first light emitting layer 110b, and the light source LSB3 corresponds to the light exit region EAA2 of the first light emitting layer 110b.

The light guide plate LGA1 of the first light emitting layer 110b may be replaced by a light guide plate including a light transmissive region and a light exit region and a light guide plate including two light transmissive regions and a light exit region (i.e., two light guide plates). In addition, the two adjacent light sources LSB1, LSB2 of the second light emitting layer 120b may be replaced by a light source adopted to provide light to the two light guide plates LGB1, LGB2 of the second light emitting layer 120b to simultaneously control whether or not there is light exiting from the light exit regions EAB1, EAB2 of the two light guide plates LGB1, LGB2 of the second light emitting layer 120s or to control the strength of the exited light. In addition, in the embodiment, the reflective layer 130b includes, for example, two reflective patterns 131 (e.g., two reflective sheets) disposed below the two light exit regions EAA1, EAA2 of the first light emitting layer 110b, respectively. The light absorbing layer 140b includes, for example, two light absorbing patterns 141 (e.g., two light absorbing blocks) disposed below the two reflective patterns 131, respectively.

Figure 6:
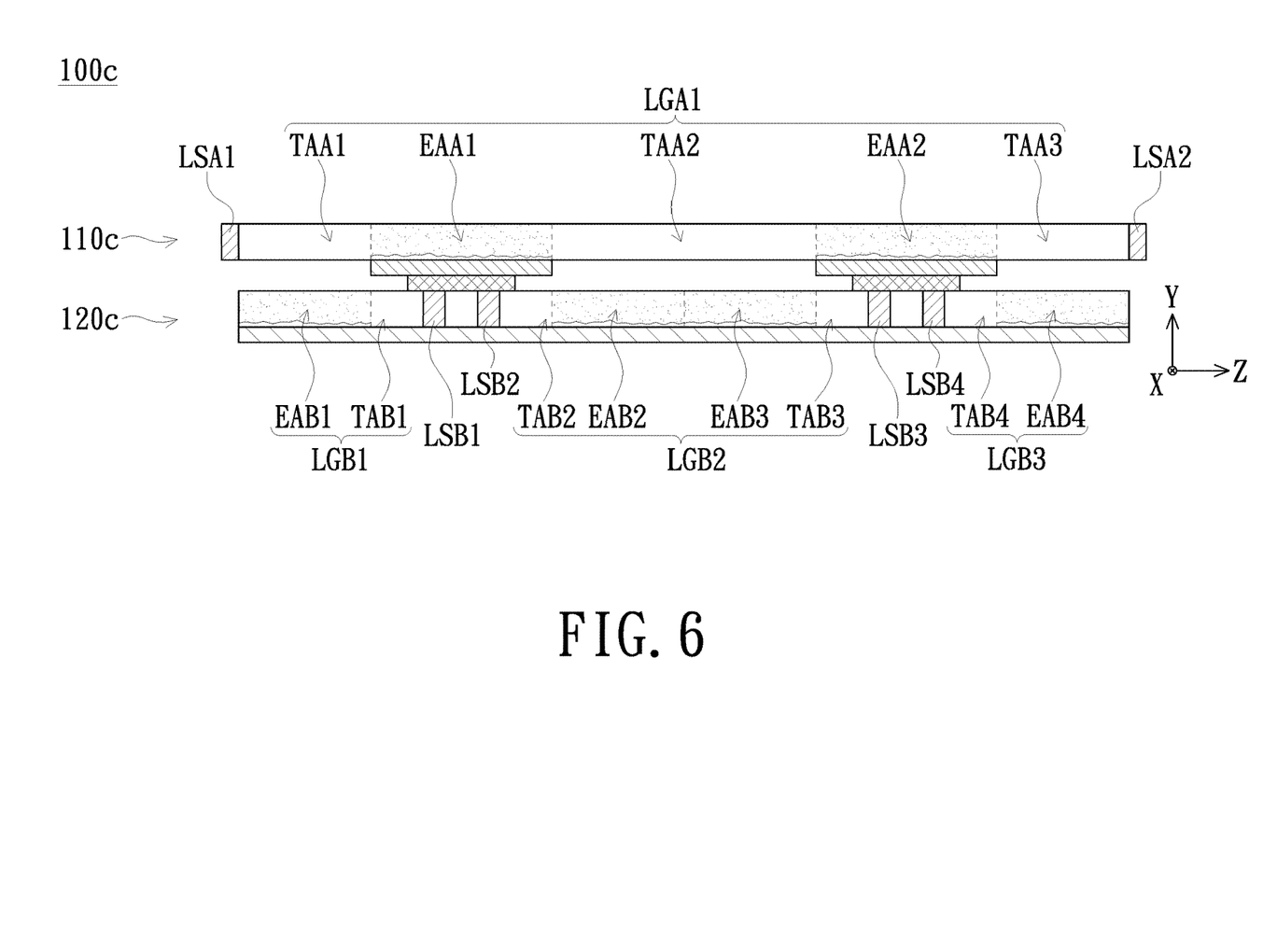
FIG. 6 is a schematic view of a backlight module in accordance with another embodiment of the invention.

FIG. 6 is a schematic view of a backlight module in accordance with another embodiment of the invention. Referring to FIG. 6, the backlight module 100c of the embodiment includes a first light emitting layer 110c and a second light emitting layer 120c. The first light emitting layer 110c includes two light sources LSA1, LSA2 and a light guide plate LGA1. The light guide plate LGA1 of the first light emitting layer 110c includes three light transmissive regions TAA1, TAA2, TAA3 and two light exit regions EAA1, EAA2 which are alternately disposed. The two light sources LSA1, LSA2 of the first light emitting layer 110c are disposed next to the light transmissive regions TAA1, TAA3 located on the two sides of the first light emitting layer 110c, respectively. The second light emitting layer 120c includes four light sources LSB1, LSB2, LSB3, LSB4 and three light guide plates LGB1, LGB2, LGB3. The light guide plate LGB2 located in the middle of the second light emitting layer 120c includes two light transmissive regions TAB2, TAB3 and two adjacent light exit regions EAB2, EAB3 located between the two light transmissive regions TAB2, TAB3.

The two light guide plates LGB1, LGB3 located on two sides of the second light emitting layer 120c each include a light transmissive region and a light exit region. The light guide plate LGB1 includes a light transmissive region TAB1 and a light exit region EAB1. The light guide plate LGB3 includes a light transmissive region TAB4 and a light exit region EAB4. The two light exit regions EAB2, EAB3 of the light guide plate LGB2 located in the middle of the second light emitting layer 120c correspond to the light transmissive region TAA2 located in the middle of the first light emitting layer 110c. The two light exit regions EAB1, EAB4 of the two light guide plates LGB1, LGB3 on the two sides of the second light emitting layer 120c correspond to the two light transmissive regions TAA1, TAA3 located on the two sides of the first light emitting layer 110c, respectively. The light exit region of the first light emitting layer 110c corresponds to one of the light transmissive regions of the light guide located in the middle of the second light emitting layer 120c and a light transmissive region of one of the light guide plates located on the two sides of the second light emitting layer 120c. That is, the light exit region EAA1 of the light guide plate LGA1 corresponds to the light transmissive region TAB1 of the light guide plate LGB1 and the light transmissive region TAB2 of the light guide plate LGB2, and the light exit region EAA2 of the light guide plate LGA1 corresponds to the light transmissive region TAB3 of the light guide plate LGB2 and the light transmissive region TAB4 of the light guide plate LGB3. The two light sources LSB1, LSB4 of the second light emitting layer 120c are disposed next to the light transmissive region TAB1, TAB4 of the light guide plates LGB1, LGB3 located on the two sides of the second light emitting layer 120c, respectively. The other two light sources LSB2, LSB3 are disposed next to the two light transmissive regions TAB2, TAB3 o of the light guide plate LGB2 located in the middle of the second light emitting layer 120c. In addition, the light sources LSB1, LSB2 of the second light emitting layer 120c correspond to the light exit region EAA1 of the first light emitting layer 110c, and the light sources LSB3, LSB4 of the second light emitting layer 120c correspond to the light exit region EAA2 of the first light emitting layer 110c.

The light guide plate LGA1 of the first light emitting layer 110c may be replaced by a light guide plate including a light transmissive region and a light exit region and a light guide plate including two light transmissive regions and a light exit region (i.e., two light guide plates). In addition, the light guide plate LGB2 located in the middle of the second light emitting layer 120c may be replaced by two light guide plates both including a light transmissive region and a light exit region (i.e., two light guide plates). In addition, any two adjacent light sources (e.g., the two light sources LSB1, LSB2 located on the left side or the two light sources LSB3, LSB4 located on the right side) of the second light emitting layer 120c may be replaced by one light source only adopted to provide light to the two light guide plates LGB1, LGB2 or LGB2, LGB3 of the second light emitting layer 120c to simultaneously control whether or not there is light exiting from the light exit regions of the two light guide plates LGB1, LGB2 or LGB2, LGB3 or to control the strength of the exited light.

In summary, the backlight module of the invention has at least one of the advantages as follow.

(1) By adopting the design of the first light emitting layer and the second light emitting layer design, the advantage of mixing-illumination type backlight module is achieved; that is, the thickness of the backlight module of the invention is smaller than that of the direct-illumination type backlight module in prior art and the local dimming of the backlight module of the invention is larger than that of the edge-illumination type backlight module in prior art.

(2) By corresponding the light transmissive region of the first light emitting layer to the respective light exit region of the second light emitting layer and corresponding the light exit region of the first light emitting layer to the respective light transmissive region of the second light emitting layer, the problem of uneven brightness in the mixing-illumination type backlight module in prior is improved; in addition, by partially overlapping the light exit region of the first light emitting layer with the light exit region of the second light emitting layer, the light leakage occurring at the boundary between the light exit regions is avoided, and thereby enhance the brightness uniformity of the backlight module of the invention.

(3) By disposing the light absorbing layer or the reflective layer above the light source of the second light emitting layer, the light leakage occurring where the light source of the second light emitting layer is disposed is avoided, and thereby enhance the brightness uniformity of the backlight module of the invention.

(4) By using the light transmissive region of the light guide plate as the light mixing space in the embodiment in which the point light source light bar is used as the light source, the distance between the light sources can be appropriately increased, so that the total number of light sources can be reduced and thereby reduce the cost.

(5) By disposing the strip microstructure on the top surface of the light guide plate to control the transmission path of the light provided by the point light source in the embodiment in which the point light source light bar is used as the light source, a light exit region can be divided into a plurality of sub-light exit regions, so that the backlight module can have a variety of local dimming effects.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first stop part, the second stop part, the first ring part and the second ring part are only used for distinguishing various elements and do not limit the number of the elements.

What is claimed is:

1. A backlight module, comprising:
   a first light emitting layer; and
   a second light emitting layer,
   wherein the first light emitting layer is disposed above the second light emitting layer, the first light emitting layer and the second light emitting layer each comprise at least one light guide plate and at least one light source, each light guide plate is disposed with at least one light source on a side thereof, each light guide plate has at least one light transmissive region and at least one light exit region, each light transmissive region of the first light emitting layer corresponds to each light exit region of the second light emitting layer, each light exit region of the first light emitting layer corresponds to each light transmissive region of the second light emitting layer, each light source is disposed next to each light transmissive region, each light transmissive region is located between each light source and each light exit region, and each light exit region of the first light emitting layer corresponds to each light transmissive region and each light source of the second light emitting layer.

2. The backlight module according to claim 1, wherein the first light emitting layer comprises one light source and one light guide plate, the light guide plate of the first light emitting layer comprises two light transmissive regions and one light exit region located between the two light transmissive regions, the light source of the first light emitting layer is disposed next to one of the two light transmissive regions of the first light emitting layer, the second light emitting layer comprises two light sources and two light guide plates, each light guide plate of the second light emitting layer comprises one light transmissive region and one light exit region, the two light transmissive regions of the second light emitting layer correspond to the light exit region of the first light emitting layer, the two light exit regions of the second light emitting layer respectively correspond to the two light transmissive regions of the first light emitting layer, and the two light sources of the second light emitting layer are respectively disposed next to the light transmissive region of each light guide plate of the second light emitting layer.

3. The backlight module according to claim 1, wherein the first light emitting layer comprises two light sources and one light guide plate, the light guide plate of the first light emitting layer comprises two light transmissive regions and two adjacent light exit regions located between the two light transmissive regions, the two light sources of the first light emitting layer are respectively disposed next to the two light transmissive regions of the first light emitting layer, the second light emitting layer comprises two light sources and two light guide plates, each light guide plate of the second light emitting layer comprises one light transmissive region and one light exit region, the two light transmissive regions of the second light emitting layer respectively correspond to the two light exit regions of the first light emitting layer, the two light exit regions of the second light emitting layer respectively correspond to the two light transmissive regions of the first light emitting layer, and the two light sources of the second light emitting layer are respectively disposed next to the light transmissive region of each light guide plate of the second light emitting layer.

4. The backlight module according to claim 1, wherein the first light emitting layer comprises two light sources and one light guide plate, the light guide plate of the first light emitting layer comprises three light transmissive regions and two light exit regions which are alternately disposed, the two light sources of the first light emitting layer are respectively disposed next to the light transmissive regions located on two sides of the first light emitting layer, the second light emitting layer comprises three light sources and three light guide plates, each light guide plate of the second light emitting layer comprises one light transmissive region and one light exit region, two of the light transmissive regions of the second light emitting layer correspond to one of the light exit regions of the first light emitting layer, the other one of the light transmissive regions of the second light emitting layer corresponds to the other one of the light exit regions of the first light emitting layer, the three light exit regions of the second light emitting layer respectively correspond to the three light transmissive regions of the first light emitting layer, and the three light sources of the second light emitting layer are respectively disposed next to the light transmissive region of each light guide plate of the second light emitting layer.

5. The backlight module according to claim 1, wherein the first light emitting layer comprises two light sources and one light guide plate, the light guide plate of the first light emitting layer comprises three light transmissive regions and two light exit regions which are alternately disposed, the two light sources of the first light emitting layer are respectively disposed next to the light transmissive regions located on two sides of the first light emitting layer, the second light emitting layer comprises four light sources and three light guide plates, the light guide plate located in the middle of the second light emitting layer comprises two light transmissive regions and two adjacent light exit regions located between the two light transmissive regions, the two light guide plates located on two sides of the second light emitting layer each comprise one light transmissive region and one light exit region, the two light exit regions of the light guide plate located in the middle of the second light emitting layer correspond to the light transmissive region located in the middle of the first light emitting layer, the two light exit regions of the two light guide plates located on two sides of the second light emitting layer respectively correspond to the two light transmissive regions located on two sides of the first light emitting layer, each light exit region of the first light emitting layer corresponds to one of the light transmissive regions of the light guide plate located in the middle of the second light emitting layer and the light transmissive region of one of the light guide plates located on two sides of the second light emitting layer, two of the light sources of the second light emitting layer are respectively disposed on the light transmissive region of each light guide plate located on two sides of the second light emitting layer, the other two of the light sources of the second light emitting layer are respectively disposed next to the two light transmissive regions of the light guide plate located in the middle of the second light emitting layer.

6. The backlight module according to claim 1, wherein each light exit region of each light guide plate is disposed with a dotted microstructure.

7. The backlight module according to claim 6, wherein each light guide plate has a top surface and a bottom surface opposite to each other, and the dotted microstructure is disposed on the top surface or the bottom surface.

8. The backlight module according to claim 7, wherein the dotted microstructure is disposed on the bottom surface, the top surface of each light guide plate is disposed with a stripe microstructure, the stripe microstructure comprises a plurality of strip patterns, each strip pattern extends to cover each light transmissive region and each light exit region of the light guide plate.

9. The backlight module according to claim 1, wherein each light source is a light emitting diode light bar.

10. The backlight module according to claim 9, wherein in a normal direction of a light entrance surface of each light guide plate of the second light emitting layer, a width of each light exit region of each light guide plate is A, a width of each light transmissive region of each light guide plate is B, the light emitting diode light bar comprises a plurality of light emitting diodes arranged along the light entrance surface, a distance between the adjacent two light emitting diodes is C, and $C<B\leq A$, wherein each light entrance surface is a surface to which each light source faces.

11. The backlight module according to claim 10, wherein $2C<GB\leq 0.95$ A.

12. The backlight module according to claim 1, wherein each light exit region of the first light emitting layer and each light exit region of the second light emitting layer are partially overlapped.

13. The backlight module according to claim 1, further comprising a reflective layer disposed between the first light emitting layer and the second light emitting layer, located below each light exit region of the first light emitting layer, and covering each light source of the second light emitting layer.

14. The backlight module according to claim 13, further comprising a light absorbing layer disposed between the reflective layer and the second light emitting layer and covering each light source of the second light emitting layer.

15. The backlight module according to claim 1, further comprising a light absorbing layer disposed between the first light emitting layer and the second light emitting layer and covering each light source of the second light emitting layer.

16. The backlight module according to claim 1, further comprising a reflective layer disposed below each light guide plate of the second light emitting layer.

* * * * *